US005586092A

United States Patent [19]

Seo

[11] Patent Number: 5,586,092
[45] Date of Patent: Dec. 17, 1996

[54] MAGNETOOPTIC DISK PLAYER

[75] Inventor: Young-sun Seo, Suwon, Rep. of Korea

[73] Assignee: Samsung Electronics Co., Ltd., Kyungki-Do, Rep. of Korea

[21] Appl. No.: 353,975

[22] Filed: Dec. 6, 1994

[30] Foreign Application Priority Data

Dec. 6, 1993 [KR] Rep. of Korea .................. 93-26599

[51] Int. Cl.⁶ ..................... G11B 13/04; G11B 21/12
[52] U.S. Cl. ................. 369/13; 369/231; 369/244; 369/77.2
[58] Field of Search .................... 360/114; 369/75.2, 369/77.2, 13, 231, 244, 249

[56] References Cited

U.S. PATENT DOCUMENTS

| | | | |
|---|---|---|---|
| 5,224,079 | 6/1993 | Inoue | 369/13 |
| 5,226,024 | 7/1993 | Mukawa | 369/13 |
| 5,299,185 | 3/1994 | Sakurai et al. | 369/77.2 |
| 5,309,421 | 5/1994 | Fujisawa | 369/77.2 |
| 5,450,377 | 9/1995 | Eom | 369/13 |

*Primary Examiner*—Robert S. Tupper
*Assistant Examiner*—George J. Letscher
*Attorney, Agent, or Firm*—Sughrue, Mion, Zinn, Macpeak & Seas

[57] ABSTRACT

A magnetooptic disk player records and/or reproduces the information of a magnetooptic disk loaded into a disk cartridge using an optical pickup and a magnetic head. The apparatus loads and unloads the magnetooptic disk cartridge on a deck. When a recordable magnetooptic disk cartridge is unloaded, the magnetic head is raised, to be completely protected from damage.

11 Claims, 13 Drawing Sheets

MAGNETOOPTIC DISK PLAYER

BACKGROUND OF THE INVENTION

1. Field of the Invention

The present invention relates to a magnetooptic recording and reproducing apparatus which records information by projecting a focused optical beam on a recording medium and simultaneously applying a magnetic field to the recording medium and reproduces information recorded on the medium, and more particularly, to a portable magnetooptic disk player which uses a magnetooptic disk cartridge in which a magnetooptic disk is rotatably received.

2. Description of the Related Art

Generally, a magnetooptic disk has recording layers in which desired information is recorded and the recorded information is reproduced using a magnetooptic disk player which has an optical pickup for the projecting of a focused optical beam and a bias magnet for applying a magnetic field. The recording layers, for example, are composed of a magnetic material, such as TbFe or TbFeCo. This magnetooptic disk is received in a caddy to form a disk cartridge so that the disk is loaded in a disk drive together with the caddy.

Recently, a magnetooptic disk cartridge called a "minidisk" (64 mm diameter) was placed on the market by Sony, and the development of a player therefor has progressed actively. There are two types of currently available minidisks: a recordable type shown in FIGS. 1A and 1B and a reproduction-only type shown in FIGS. 2A and 2B.

Referring to FIGS. 1A and 1B, the recordable minidisk 1 has a cartridge cell 2 having two openings 3 and 4 on respective sides thereof and a shutter 5 which moves along a sliding groove 6 so as to open and close openings 3 and 4. Both sides of a disk 9 in cartridge cell 2 are exposed through openings 3 and 4. In FIGS. 2A and 2B, the reproduction-only minidisk 1' has a cartridge cell 2' having an opening only on one side thereof and a shutter 5' which moves along a sliding groove 6' so as to open and close opening 3'. Thus, only one side of disk 9' is exposed through opening 3'.

Arrows 7 and 7' on the upper surface of cartridge cell 2 and 2' of minidisks 1 and 1' each depict the direction of insertion into a player. Recording and reproducing detection grooves 8 and 8' each having a different size are formed on the lower surface of cartridge cell 2 and 2' so that it can be determined whether an inserted minidisk is a recordable type or a reproduction-only type based on the size thereof. Loading grooves 10 and 10' are provided at the right and left sides of the lower surface of cartridge cells 2 and 2'. A plurality of cartridge loading grooves 11 and 11', for loading the disk cartridge into a deck, are provided on the lower surface of cartridge cells 2 and 2'.

A portable player (Sony model MZ-1) is now available as a recording and reproducing apparatus for the above-described minidisks. This player is formed with a slot into which the minidisk can be inserted by means of a "slot-in" method, and includes a spindle motor which rotates the inserted minidisk, an optical pickup which projects a focused optical beam onto one side of the disk, and a magnetic head which applies a magnetic field to the other side of the disk. The cartridge of the minidisk inserted into the slot is loaded into a deck, in the state where the shutter is pushed aside to provide access to the opening. Meanwhile, the disk in the cartridge is loaded on a turntable rotated by a spindle motor. When choosing the reproducing mode with respect to the rotating disk, only the optical pickup operates and the magnetic head is raised away from the disk. When choosing the recording mode, the magnetic head is lowered by a motor, to be disposed near the surface of the disk, and move together with the optical pickup. However, with a reproduction-only minidisk loaded, the magnetic head does not descend even if the recording mode is selected.

In general, it is desirable that a portable player be lightweight and compact and consume little electrical power. However, in the case of the Sony minidisk player, it is difficult to make the minidisk player small and lightweight because the minidisk inserting structure (using the above-noted slot-in method) and the magnetic head ascending/descending structures are complicated and require a large space. Also, as the minidisk is inserted/extracted and the magnetic head ascends/descends by separate driving means, power is consumed excessively.

An apparatus for mechanically solving the above problems is shown in FIGS. 3 and 4. Here, when magnetooptic disk cartridge 1 is inserted into cartridge holder 20, locking protrusion 55 of drawing-out member 50 engages with locking pin 61, and locking portion 95 of slide locking member 90 engages with locking pin 94 formed on cartridge holder 20. As cartridge 1 is inserted, a protruding pin 85 installed on contacting end 54 of drawing-out member 50 is pushed, so that supporting stick 86 for supporting protruding portion 45 is pushed back. Therefore, magnetic head 30 is lowered to make contact with the upper surface of magnetooptic disk 9 in disk cartridge 1. When cartridge holder 20 is in the open state, if disk cartridge 1 is drawn out to be exchanged with another disk cartridge, there is a potential risk of damaging the lowered magnetic head 30 due to contact with the moving cartridge.

SUMMARY OF THE INVENTION

It is an object of the present invention to provide a magnetooptic disk player which is lightweight and compact so and which consumes little electrical power to be suitable for portable applications.

Another object of the present invention is to provide a magnetooptic disk player in which a magnetooptic disk cartridge is mechanically loaded and unloaded on a main body and a magnetic head is protected from damage.

A magnetooptic disk player for accomplishing the above object has a cartridge holder into which magnetooptic disk cartridge is inserted, a magnetic head which contacts the magnetooptic disk and a deck onto which the magnetooptic disk is loaded, the magnetooptic disk player comprising:

- a head supporting member for supporting the magnetic head, and which can ascend and descend so that the magnetic head selectively makes contact with the magnetooptic disk;
- a sliding member installed on the cartridge holder, and which can be pushed by the inserted magnetooptic disk cartridge and then restored to the initial state; and
- head ascending support means installed on the sliding member, for lifting the head supporting member when the cartridge holder is open and for lowering the head supporting member when the cartridge holder is closed.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 5:
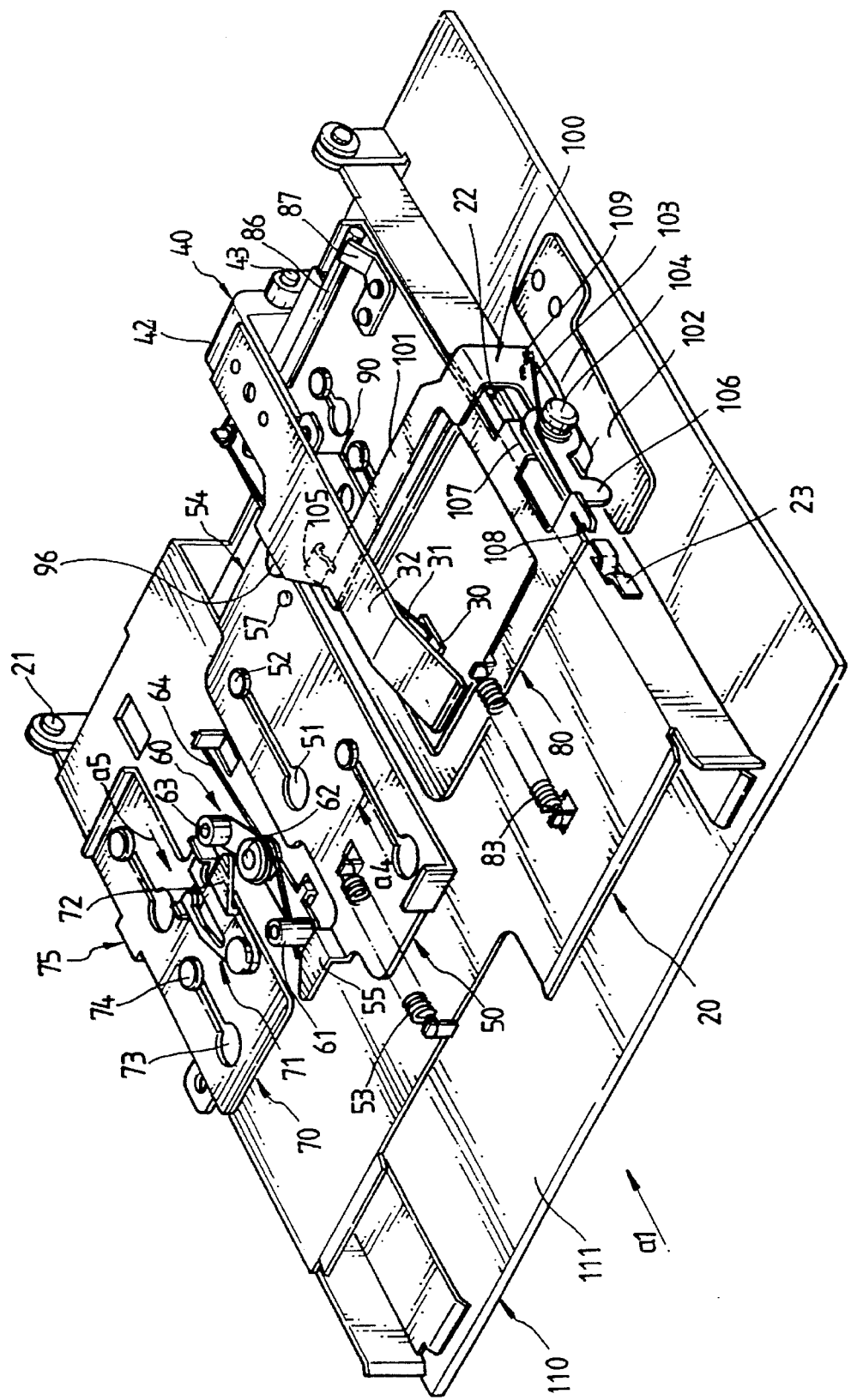
FIG. 5 is a perspective view showing the state where the cartridge holder of a magnetooptic disk player according to the preferred embodiment of the present invention is closed.
Figure 6:
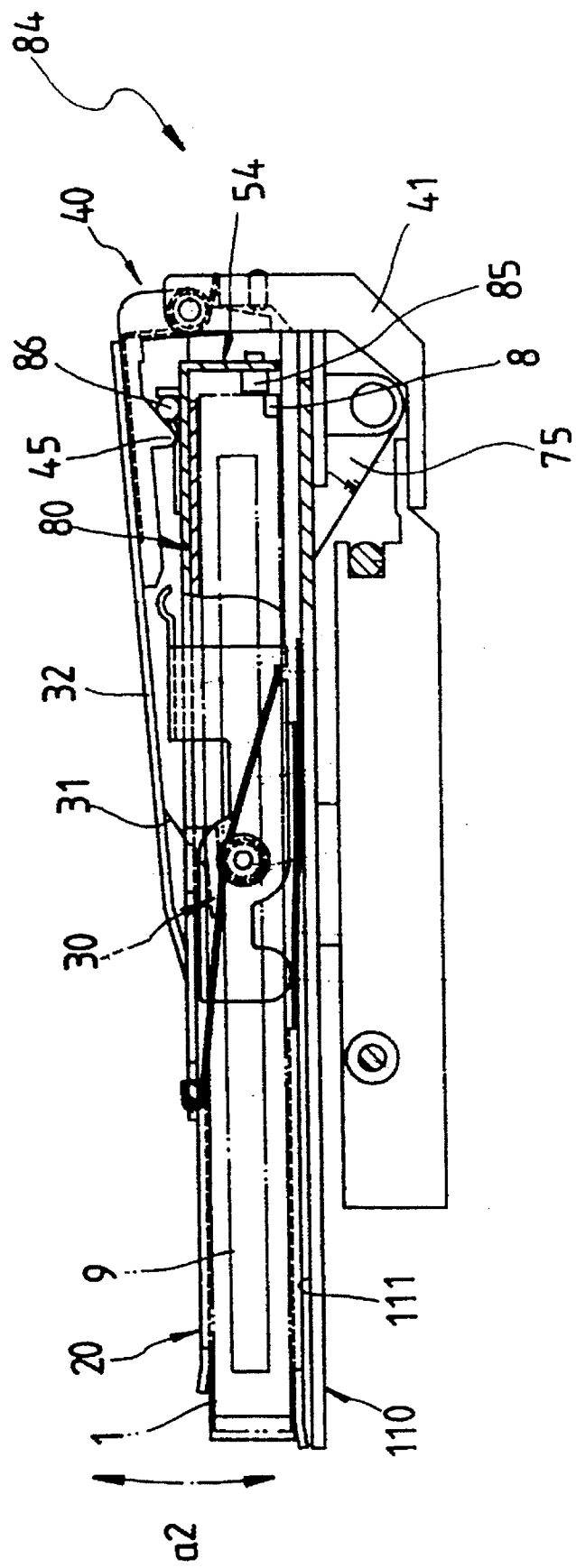
FIG. 6 is a side view showing the state where the recordable magnetooptic disk cartridge is inserted in the disk player of FIG. 5.

In FIGS. 5 and 6, reference numeral 110 represents a deck and reference numeral 20 represents a cartridge holder. Deck 110 has an upper surface 111 onto which minidisk 1 or 1' (FIGS. 1A & 1B or FIGS. 2A & 2B) is loaded.

Cartridge holder 20 receives minidisk 1 or 1' which is inserted the direction of arrow a1, is connected to the deck 110 by a hinge 21, and is rotated in the direction of arrow a2 to make contact with or separate from the upper surface of deck 110. Shutter opener 22 is formed at one side of cartridge holder 20, for opening shutter 5 or 5' as the minidisk is inserted in a known manner. Shutter closer 23 is provided the one side of cartridge holder 20, for closing shutter 5 or 5' as the minidisk is drawn out in the opposite direction in a known manner.

Figure 8:
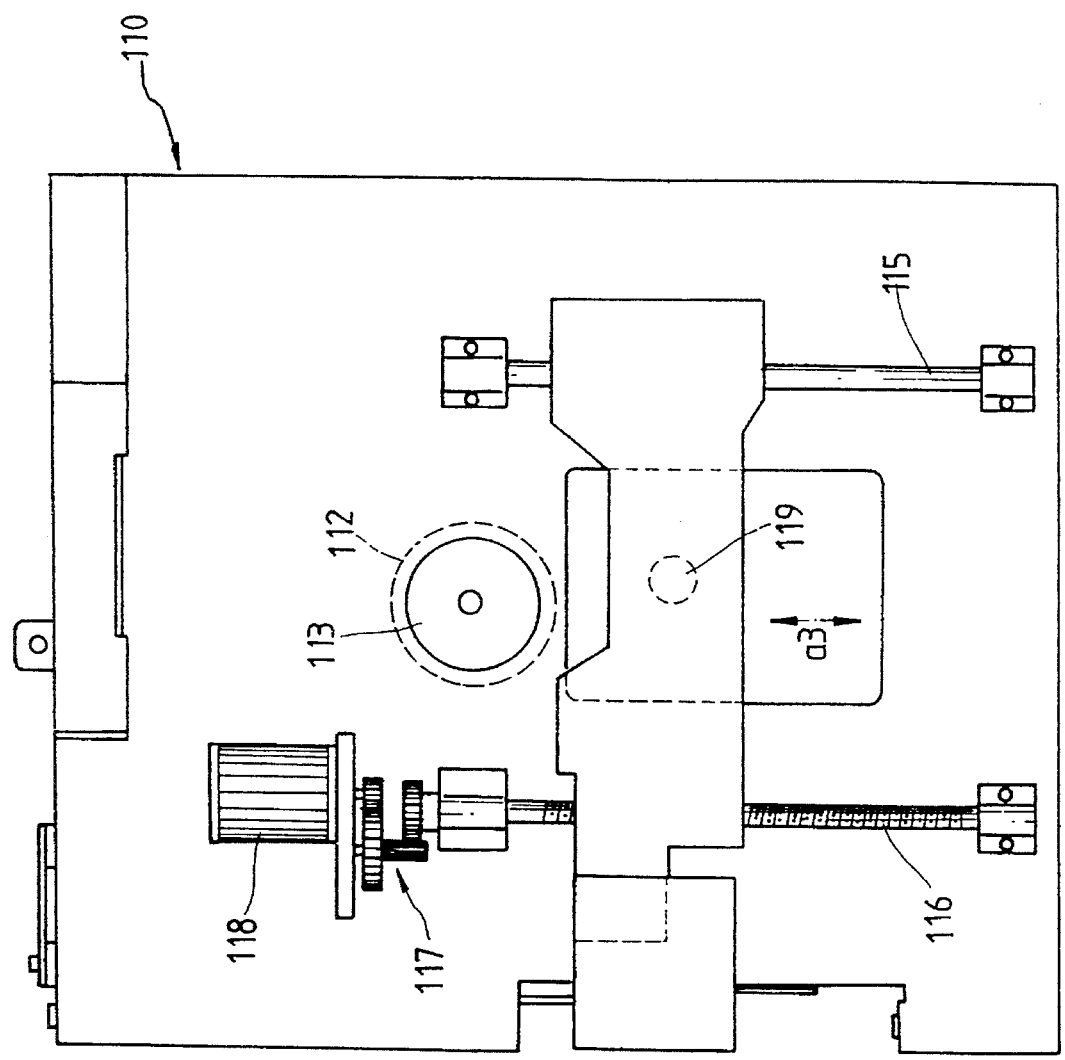
FIG. 8 is a view from the bottom of the deck of the magnetooptic disk player according to the present invention.
Figure 12:
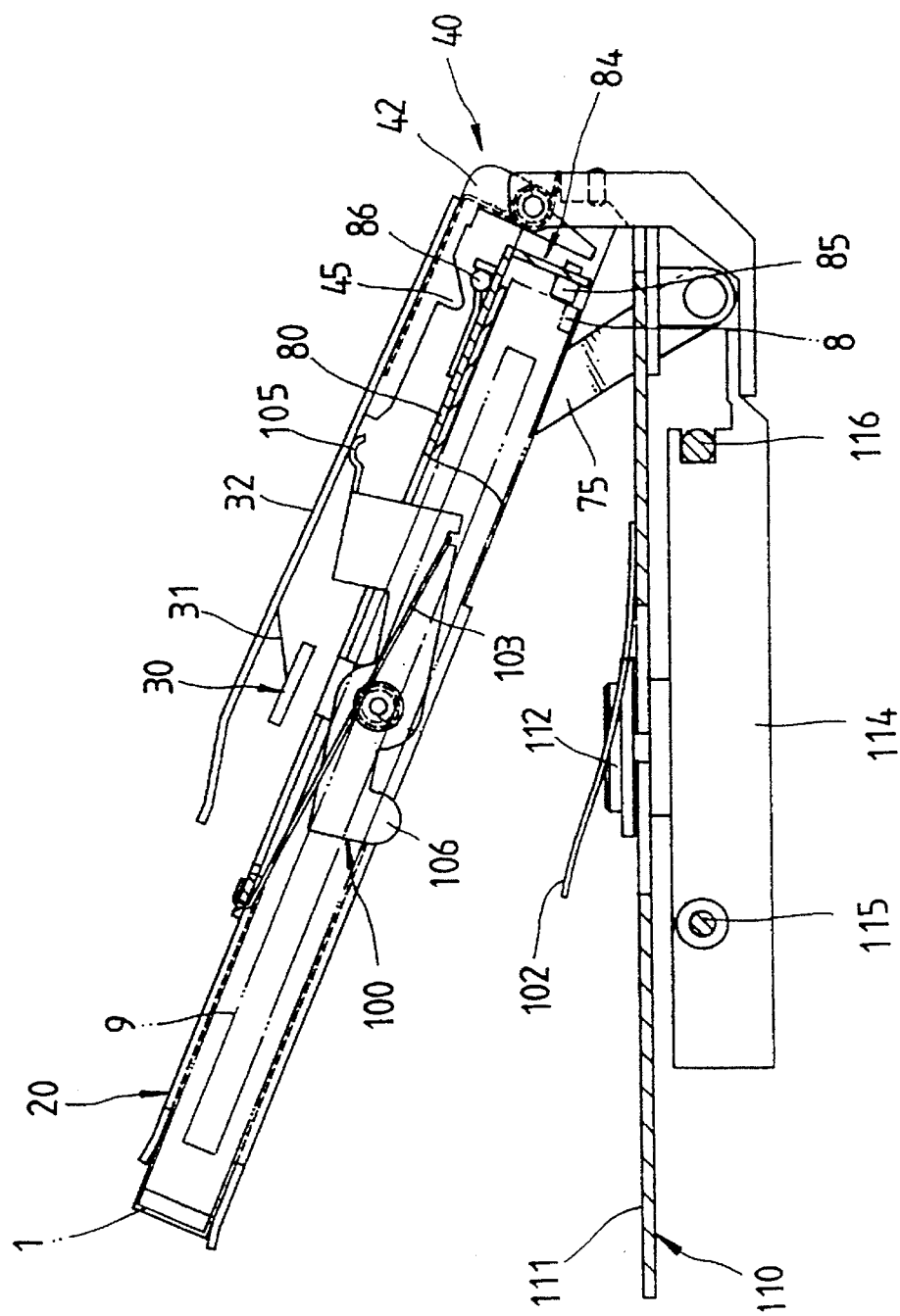
FIG. 12 is a side view showing the state where the recordable magnetooptic disk cartridge is inserted in the preferred embodiment.

As shown in FIGS. 8 and 12, a turntable 112 onto which the magnetooptic disk is loaded is installed on the upper surface 111 of deck 110. Turntable 112 is directly connected to a spindle motor 113 mounted below deck 110. An optical pickup assembly 114, supported by a guide rod 115 and a screw shaft 116 which extend parallel to each other, is installed below deck 110 and moves in the direction of arrow a3 in response to rotation of screw shaft 116. Screw shaft 116 is connected to transporting motor 118 through a gear train 117. The optical pickup assembly 114 has objective lens 119 and, projects optical beam focused by the lens 119 onto one side of magnetooptic disk loaded on turntable 112 of the upper surface of deck 110. As in the conventional apparatus, optical pickup assembly 114 receives the optical beam reflected from the magnetooptic disk and thereby detects electrical signals, such as a reproducing signal, in a known manner.

Figure 9:
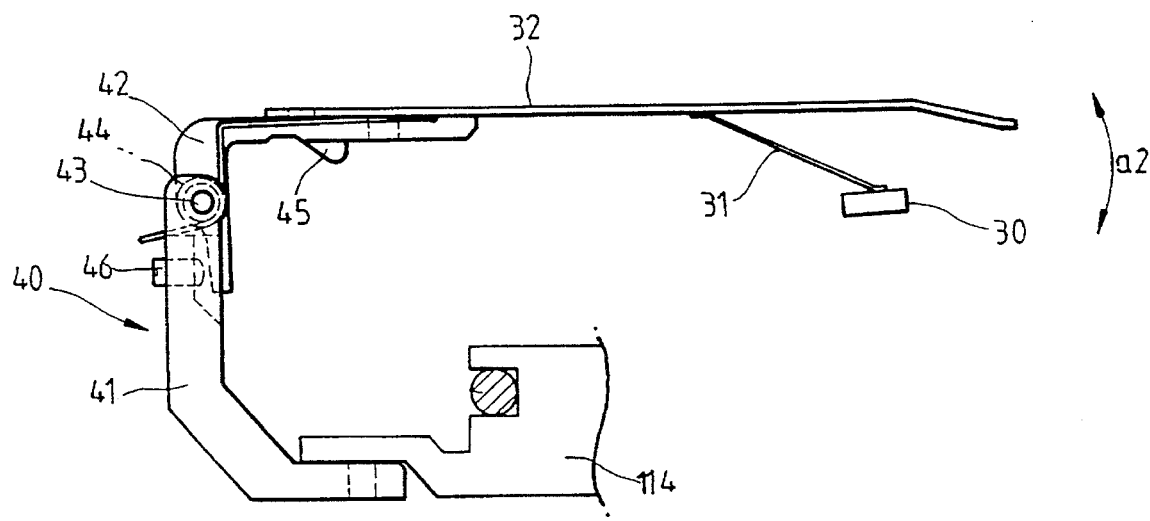
FIG. 9 is an extracted side view showing a connecting portion between an optical pickup assembly and a magnetic head in the magnetooptic disk player according to the preferred embodiment of the present invention.
Figure 10:
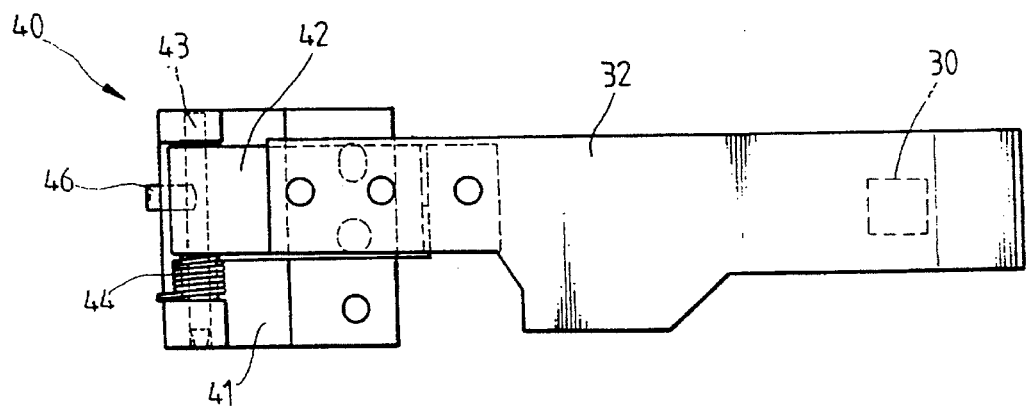
FIG. 10 is an extracted plan view showing the connecting portion between the optical pickup assembly and the magnetic head in the magnetooptic disk player according to the preferred embodiment of the present invention.

Referring to FIGS. 5, 9 and 10, a magnetic head 30, disposed on the upper side of cartridge holder 20, is attached to the end of a flexible plate spring 31 supported by a head supporting member 32. A connecting portion 40 connects optical pickup assembly 114 (FIG. 9) with head supporting member 32. The connecting portion comprises a pickup connecting member 41 connected to optical pickup assembly 114, a head connecting member 42 connected with head supporting member 32, and a hinge portion 43 for connecting pickup connecting portion 41 with head connecting portion 42. Hinge portion 43 has a central axis that is parallel to that of hinge 21 for connecting deck 110 with cartridge holder 20. Optical pickup assembly 114 and magnetic head 30 can be transported together in the direction of arrow a3 of FIG. 8 by connecting portion 40. Also, magnetic head 30 is rotated, together with head supporting member 32 and head connecting member 42, in the direction of arrow a2 which constitute the opening and closing directions of cartridge holder 20.

On the other hand, as shown in FIGS. 9 and 10, magnetic head 30 is elastically biased downward by coil spring 44 wound around hinge portion 43 and one end portion of which rests against head connecting member 42. Protruding portion 45 protruding downward is formed on head connecting member 42 of connecting portion 40 to interlock with a supporting rod (described later). An adjusting screw 46 passes through pickup connecting member 41, so that its leading end makes contact with the rear portion of head connecting member 42, in order to adjust the horizonal status of head supporting member 32.

Figure 11:
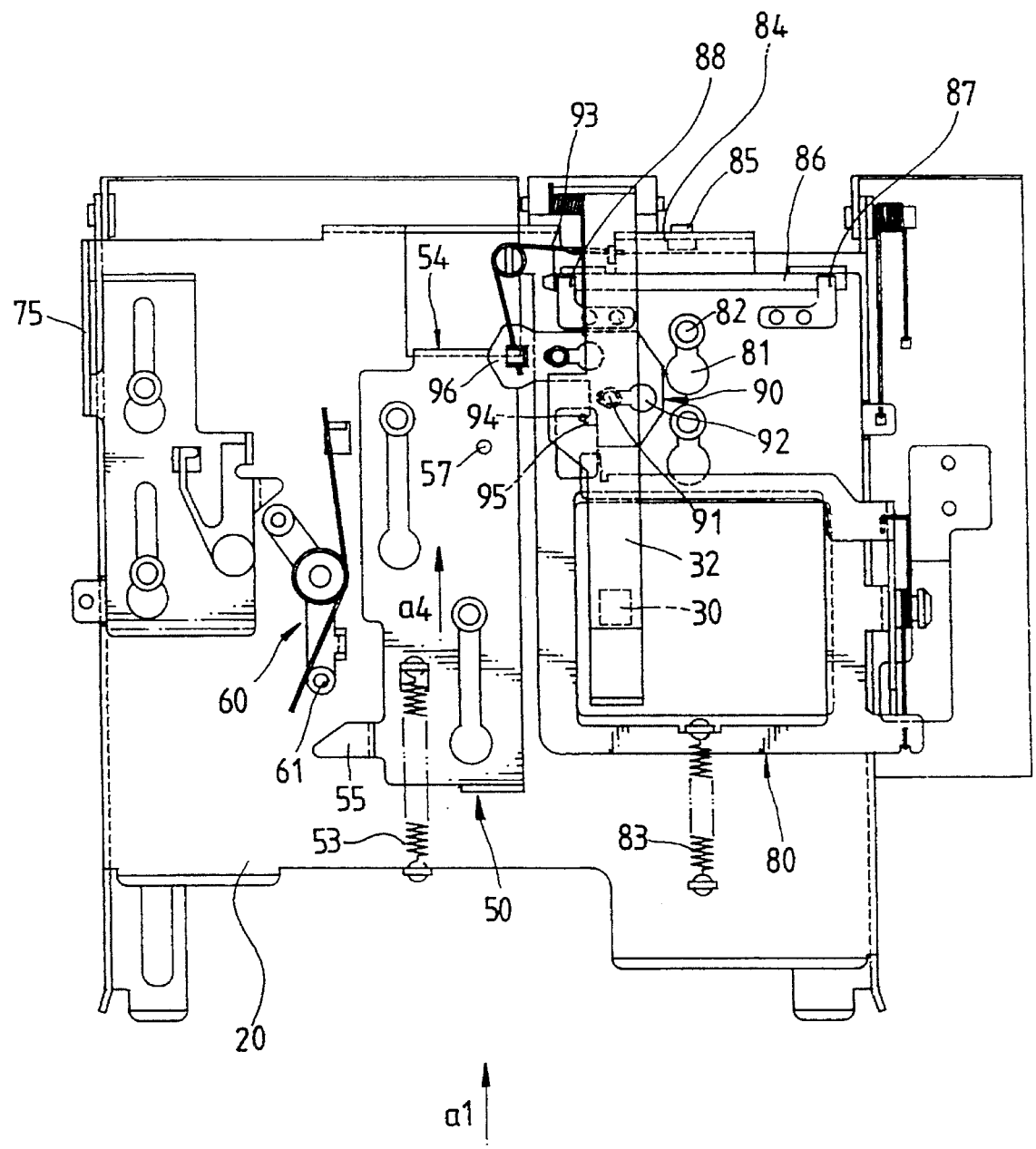
FIG. 11 is a plan view for illustrating an initial state where the magnetooptic disk cartridge is inserted into the cartridge holder of the magnetooptic disk player according to the preferred embodiment of the present invention.

As illustrated in FIGS. 5, 6 and 11, a drawing-out member 50 for pushing the loaded minidisk forward in the opposite direction of arrow a1, a locking member 60, and a locking release member 70 are provided on the upper surface of cartridge holder 20. Drawing-out member 50 is supported by an elongated hole 51 and a supporting pin 52 to move back and forth, and is elastically biased in the drawn-out direction by a spring 53. A contacting end 54 which contacts the front surface of the inserted minidisk and a locking protrusion 55 which interacts with a locking pin 61 of locking member 60 are provided on drawing-out member 50.

Locking member 60 is rotatably supported by a pivot 62, is elastically biased counterclockwise by a torsion spring 64, and has releasing pin 63 at one end thereof. Releasing pin 63 interlocks with a protruding portion 72 of a spring member 71 pivotally supported on locking release member 70, so that locking pin 61 can be pushed clockwise against the force of spring 64.

Locking release member 70 is supported by an elongated hole 73 and a supporting pin 74 to move back and forth and is connected with deck 110 via a link 75. Locking release member 70 moves back and forth with spring member 71 on cartridge holder 20 according to the opening and closing of cartridge holder 20 due to the connection of link 75 to deck 110.

As illustrated in to FIGS. 5, 6 and 11, a sliding member 80 is installed on the upper surface of cartridge holder 20, for identifying whether the inserted minidisk is a recordable type, and as the recordable minidisk 1 (FIGS. 1A and 1B) is loaded, for raising/lowing magnetic head 30 by interlocking with recordable minidisk 1. Sliding member 80 supported by an elongated hole 81 and a supporting pin 82 can move back and forth slightly with respect to cartridge holder 20 and is elastically biased forward by a spring 83. Sliding member 80 has protruding pin 85 provided on bent portion 84 formed at a rear end of sliding member 80. Protruding pin 85 is provided at a position coinciding with detecting hole 8 or 8' (FIGS. 1A, 1B, 2A and 2B) formed on inserted minidisk 1 or 1'. In the above structure, the protruding pin 85 is sized so that it cannot enter detecting hole 8 of a recordable minidisk and can enter detecting hole 8' of a reproduction-only minidisk. A head supporting rod 86 whose length is approximately equal to the radius of the magnetooptic disk is fixed by two fixing plates 87 and 88 on sliding member 80.

Referring to FIG. 11, a supporting pin 91 is provided on sliding member 80. A slide locking member 90 having a transverse elongated hole 92 is supported by supporting pin 91 so as to be able to shift in a transverse direction with respect to insertion direction of arrow a1 and is elastically biased toward drawing-out member 50 by a torsion spring 93. Slide locking member 90 has a locking protrusion 95 which is engaged with a locking pin 94 installed on the cartridge holder 20, and a locking release portion 96 which is pushed back to release the locking state of locking protrusion 95 by interlocking with an interlocking pin 57 installed on drawing-out member 50.

As illustrated in FIG. 5, sliding member 80 is formed with supporting portion 107 for installing thereon a head ascending support member 100 for raising the head. A supporting pin 104 is installed on supporting portion 107 so that head ascending support member 100 rotates centering supporting pin 104.

Head ascending support member 100 has a head supporting member contacting portion 105 for raising and lowering head supporting member 32 while in contact therewith, and an ascending/descending stand 101 which ascends and descends to support the contacting portion. A plate spring contacting portion 106 is provided on the opposite side of contacting portion 105, for lowering ascending/descending stand 101 due to the loading rotation of cartridge holder 20. Spring 103 is connected with a spring fixing hole 108 formed on sliding member 80 and with spring fixing hole 109 formed on head ascending support member 100 and is wound around supporting pin 104. Therefore, head ascending support member 100 is elastically biased downwards while rotating about supporting pin 104.

A plate spring 102 is installed on the right upper surface of deck 110 and interlocks with plate spring contacting portion 106 of head ascending support member 100 by the descending rotation of cartridge holder 20, to thereby rotate head ascending support member 100 clockwise when cartridge holder 20 is lowered onto deck 110.

The operation of the magnetooptic disk player in accordance with the preferred embodiment of the present invention is described below.

FIG. 11 shows the open state of cartridge holder 20. When recordable minidisk 1 is inserted into cartridge holder 20, the front surface of inserted minidisk 1 (not shown) is in contact with the contacting end 54 of drawing-out member 50. At this state, when minidisk 1 is pushed to be inserted into cartridge holder 20, drawing-out member 50 is pushed in a direction of arrow a4 and spring 53 extends so that locking protrusion 55 of drawing-out member 50 is locked by moving past locking pin 61 of locking member 60 and engaging therewith. Locking protrusion 55 easily passes by locking pin 61, due to the slope of the locking protrusion and locking pin 61 is restored readily so that the locking process proceeds smoothly.

Figure 1A:
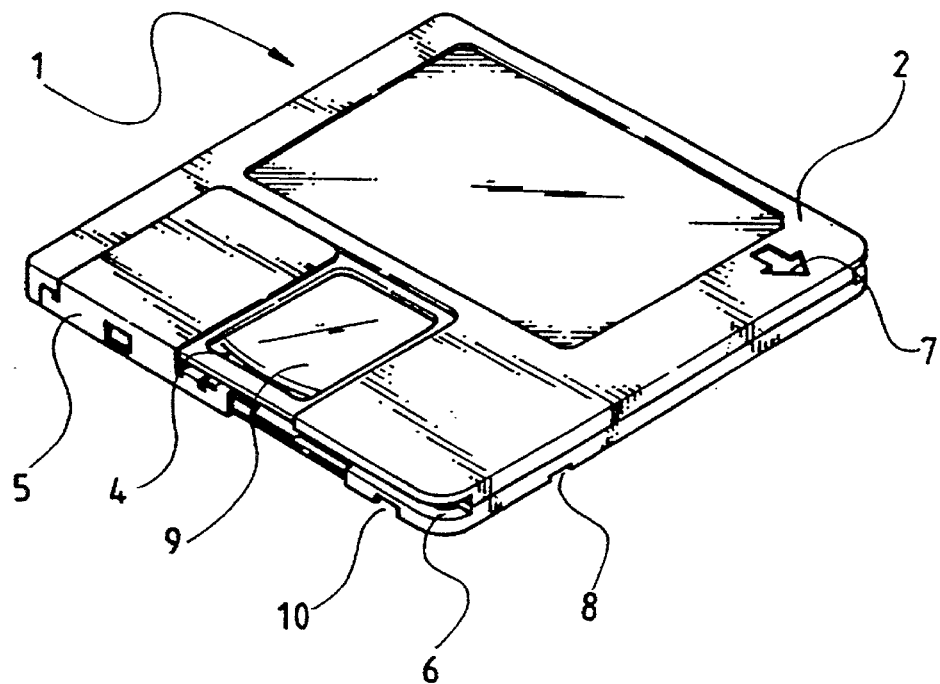
FIGS. 1A and 1B are perspective views of a recordable magnetooptic disk cartridge.
Figure 1B:
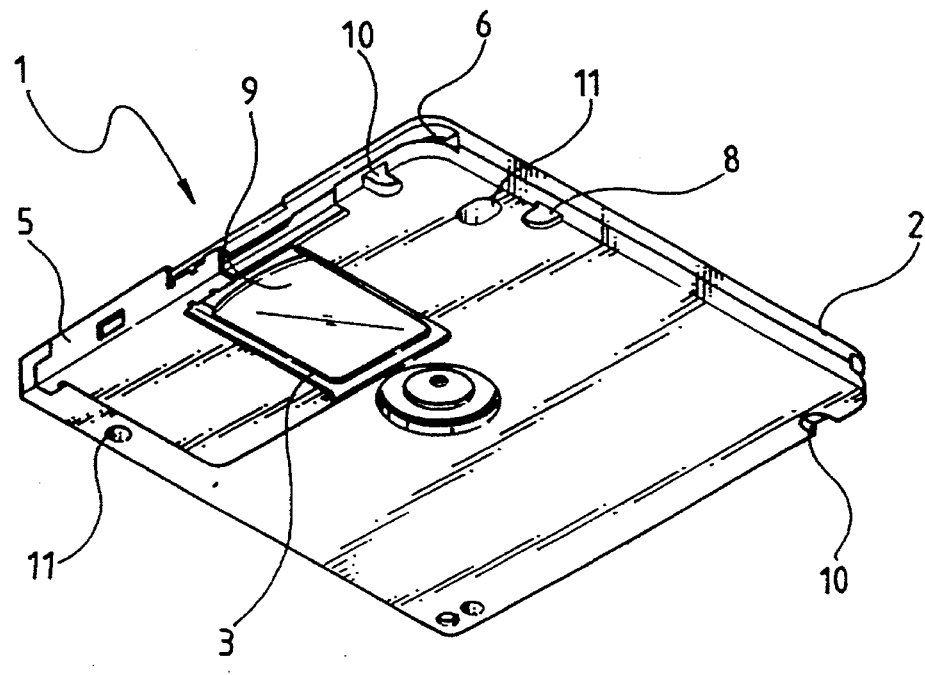
Figure 2A:
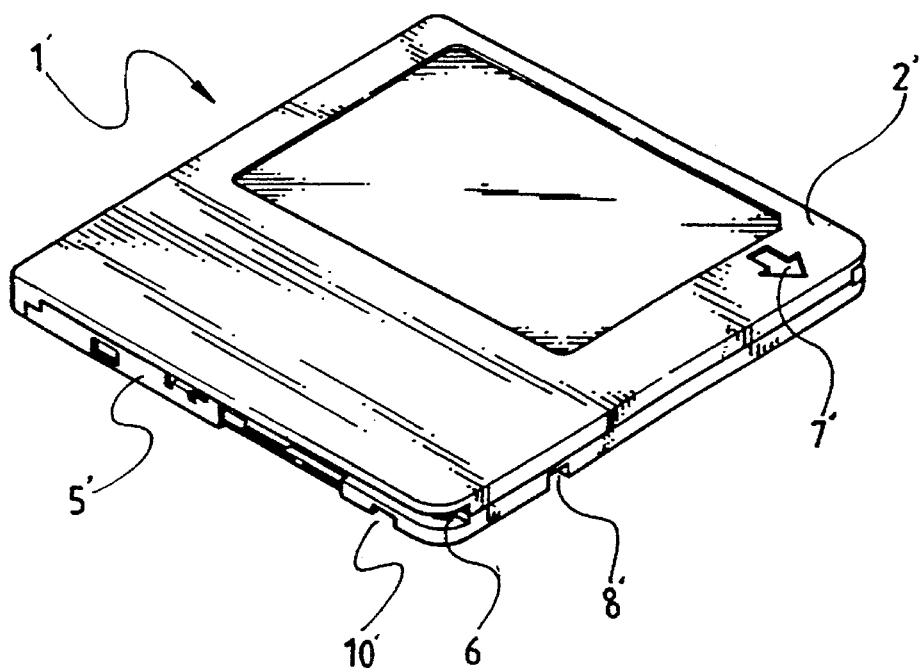
FIGS. 2A and 2B are perspective views of a reproduction-only magnetooptic disk cartridge.
Figure 2B:
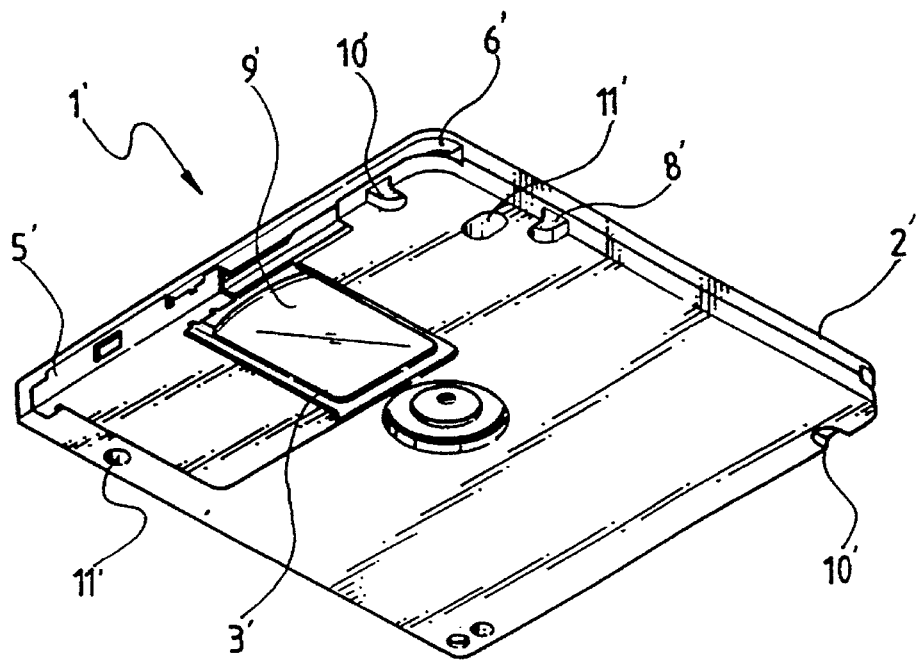
Figure 3:
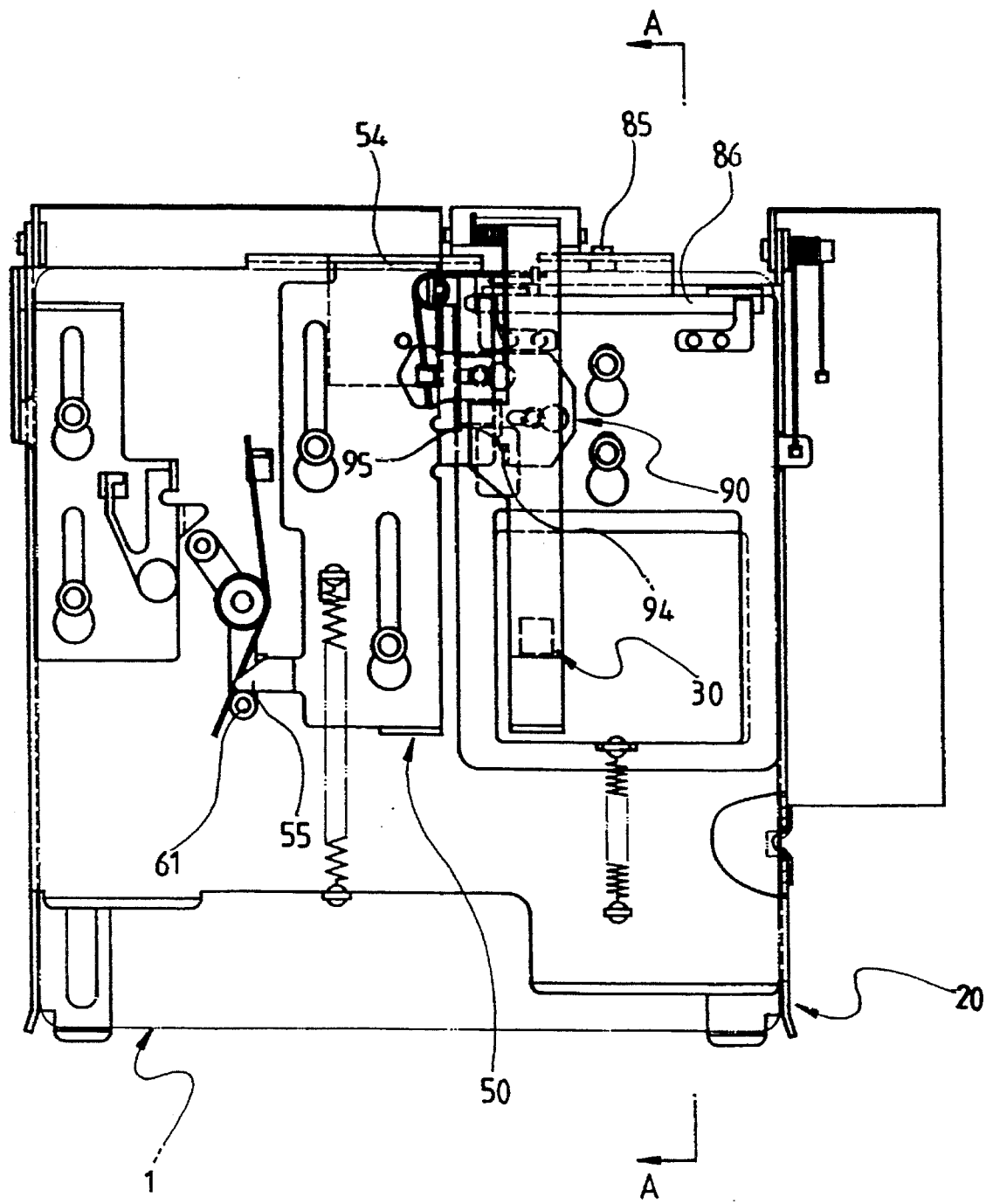
FIG. 3 is a plan view showing the state where magnetooptic disk cartridge is inserted into the opened cartridge holder of the conventional recordable magnetooptic disk player.
Figure 4:
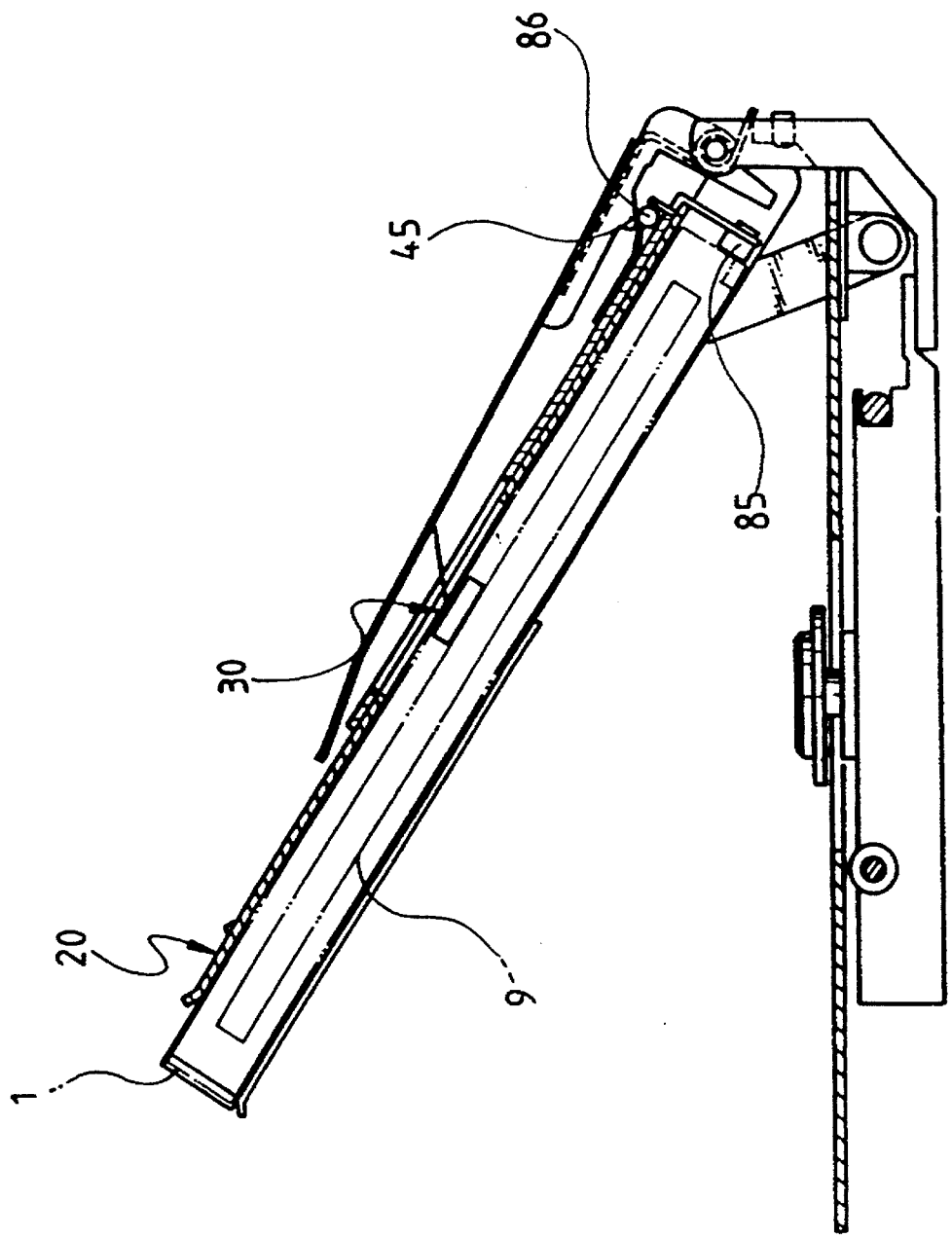
FIG. 4 is a cross-sectional view taken along the line A—A of FIG. 3.

Referring to FIG. 12, protruding pin 85 installed on bent portion 84 of sliding member 80 cannot enter detecting hole 8 of minidisk 1. Therefore, sliding member 80 is pushed back, and supporting rod 86 which supports the protruding portion 45 protruding from head connecting member 42 of connecting portion 40 moves back (i.e., in the insertion direction). Here, in the case of the conventional device (refer to FIG. 4), magnetic head 30 descends and contacts magnetooptic disk 9 within minidisk 1. However, in the present invention, in the open state of cartridge holder 20, head ascending support member 100 rotates counterclockwise due to the elasticity of the spring 103, so that head supporting member contacting portion 105 of head ascending support member 100 blocks the descent of head supporting member 32. Thus, in the above-described state, even if the user draws the magnetooptic disk cartridge 1 out of cartridge holder 20 to exchange it with another disk, the head will not be damaged.

On the other hand, sliding member 80 is pushed out slightly from its initial state. However, because locking protrusion 95 of slide locking member 90 is locked by locking pin 94 in FIG. 11, the restoring force of spring 83 allows sliding member 80 to return to its initial position so that there is no possibility of the minidisk being drawn out.

Figure 7:
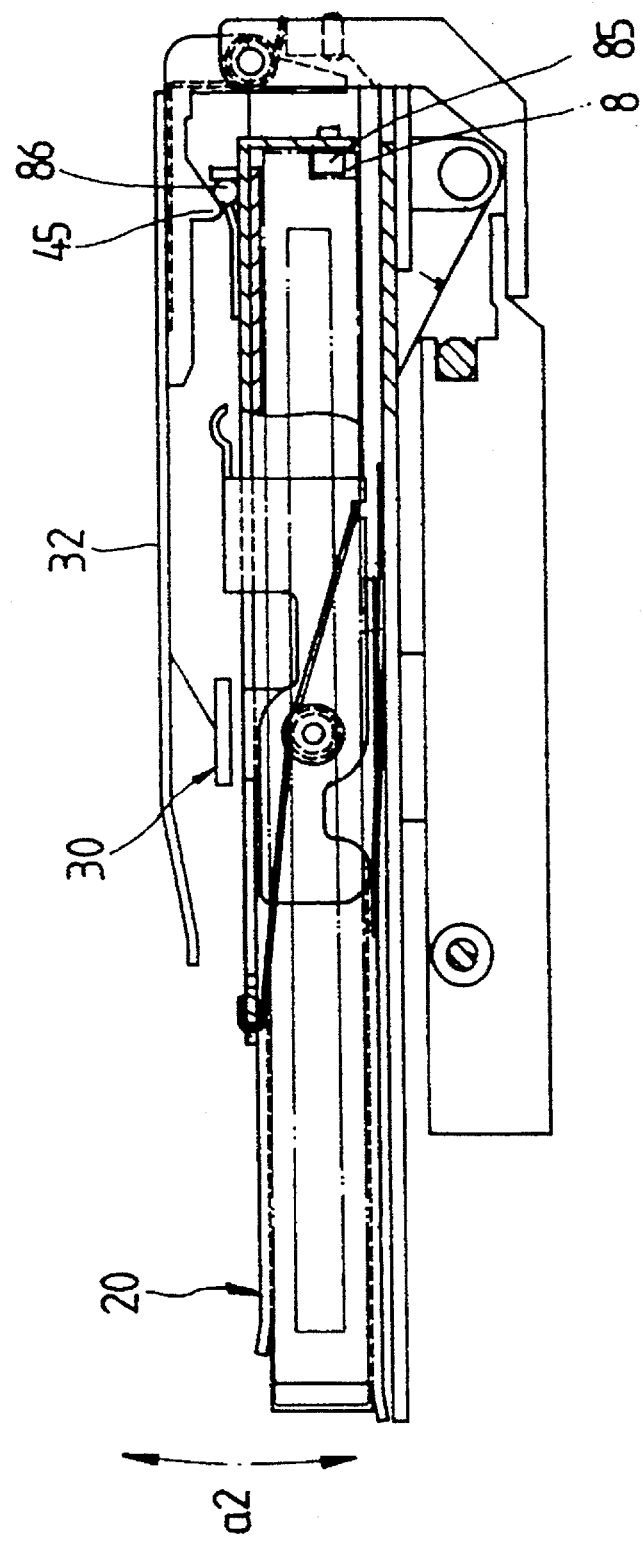
FIG. 7 is a side view showing the state where the reproduction-only magnetooptic disk cartridge is inserted in the disk player of FIG. 5.
Figure 13:
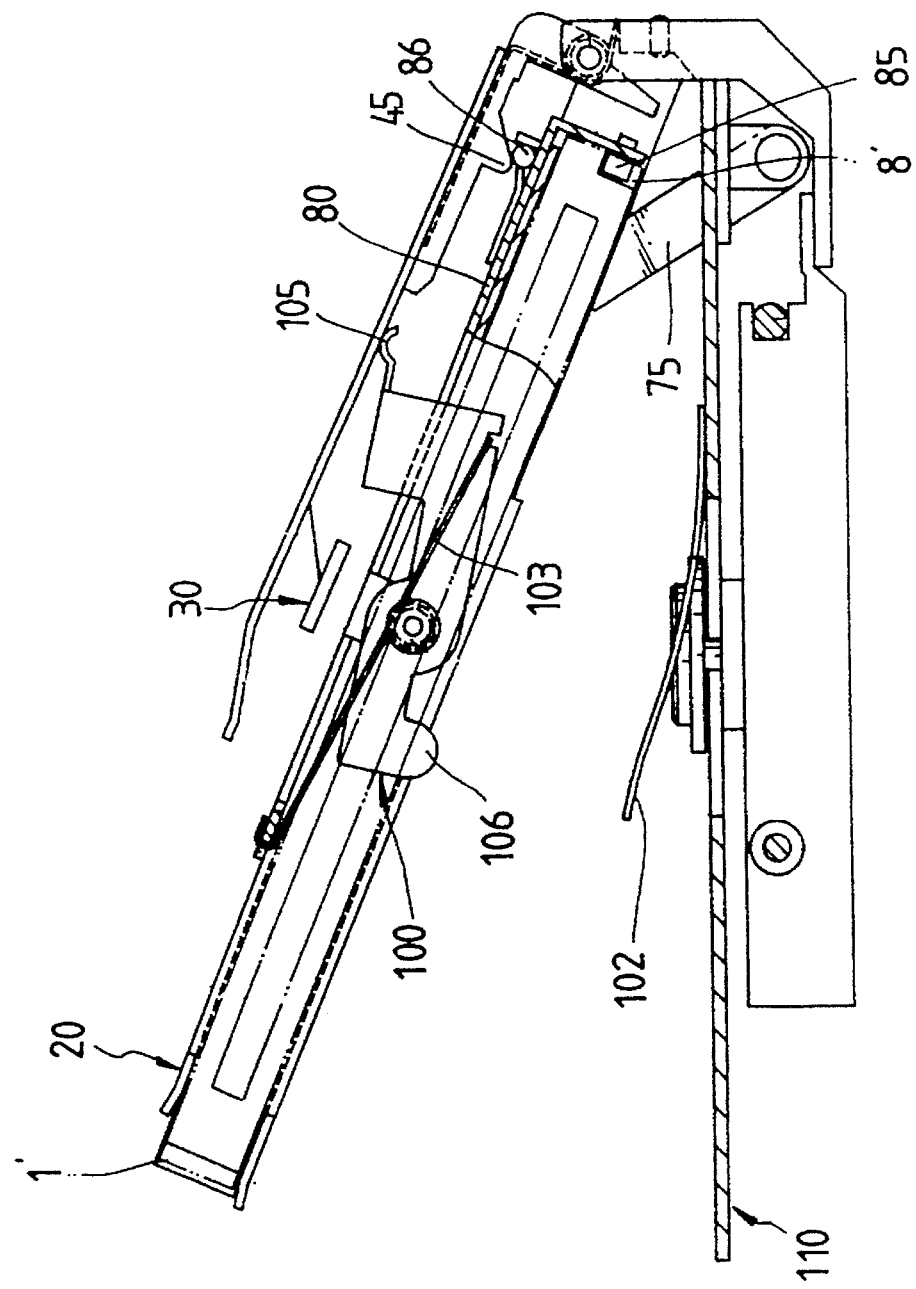
FIG. 13 is a side view showing the state where the reproduction-only magnetooptic disk cartridge is inserted in the preferred embodiment.

As shown in FIG. 13 which shows the open state of cartridge holder 20, as reproduction-only magnetooptic disk cartridge 1' is inserted, protruding pin 85 formed on bending portion 84 of sliding member 80 is received in detecting hole 8' of magnetooptic disk cartridge 1', so that of sliding member 80 is not moved by insertion of the disk cartridge. As a result, since supporting rod 86 continues to support protruding portion 45, the magnetic head does not descend. Referring to FIG. 7, although cartridge holder 20 is lowered, since supporting rod 86 continues to support protruding portion 45, the descent of magnetic head 30 installed on head supporting member 32, with respect to the disk cartridge, is prevented.

Figure 14:
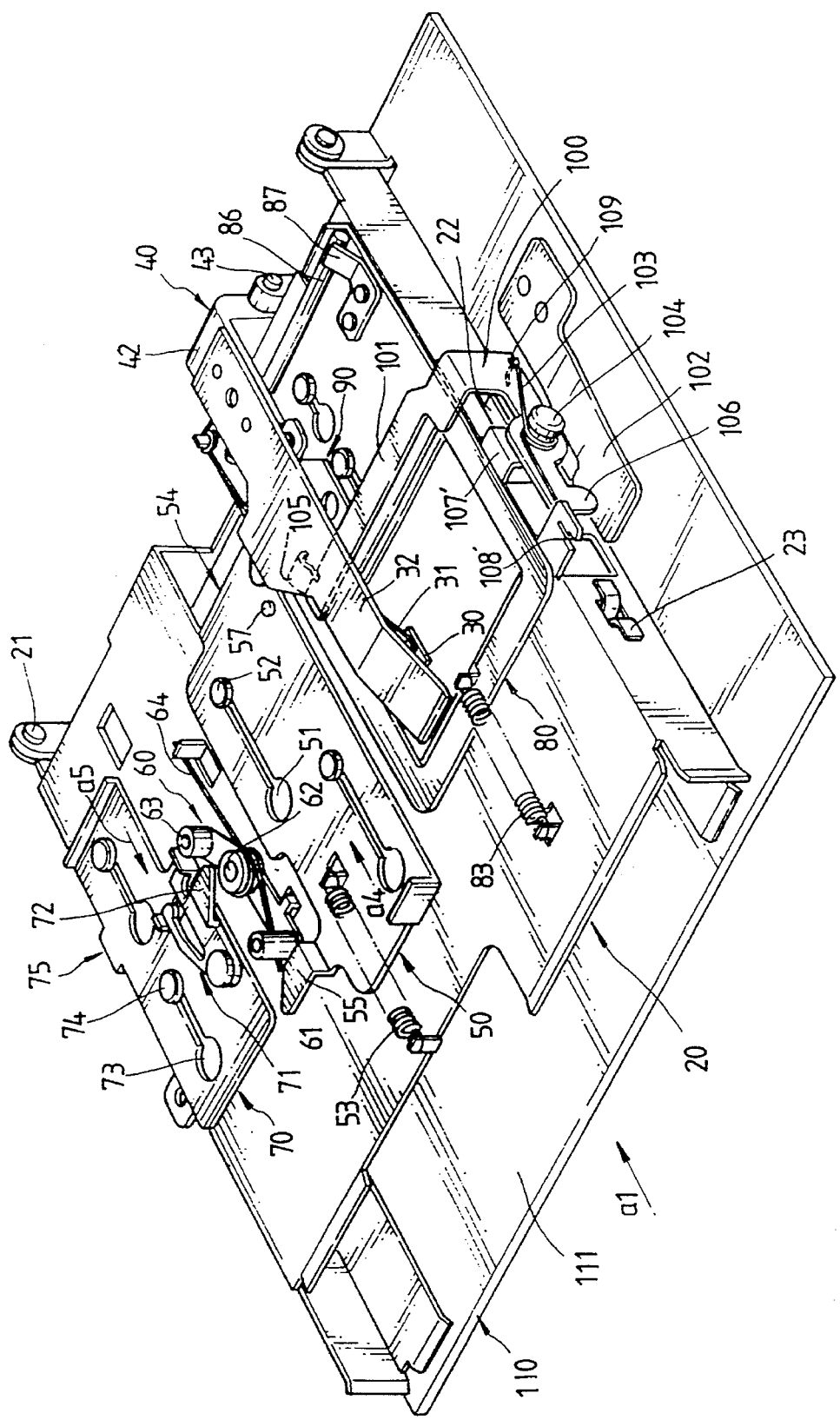
FIG. 14 is a perspective view showing another preferred embodiment according to the present invention.

In the state as shown FIGS. 13 and 14, as cartridge holder 20 is lowered so that minidisk 1 received on cartridge holder 20 is loaded on the upper surface of deck 110, protruding portion 72 of spring member 71 supported by locking releasing member 70 moves in a direction of arrow a5 and is thereby located in front of releasing pin 63 of locking member 60 due the interlocking connection of link 75 which connects locking releasing member 70 with deck 110, as shown in FIG. 5. Since spring member 71 has less elasticity than torsion spring 64 which biases elastically locking member 60 counterclockwise, locking member 60 does not rotate at this time and the locking state of locked member 60 is not released. Head ascending support member 100, biased in a counterclockwise direction, descends with cartridge holder 20, to enable plate spring contacting portion 106 to contact plate spring 102 installed on deck 110. Therefore, head ascending support member 100 rotates smoothly clockwise while head supporting member contacting portion 105 of head ascending support member descends.

That is, as shown in FIG. 6, as a recordable magnetooptic disk cartridge is inserted, head supporting member 32 descends, and magnetic head 30 contacts the upper surface of magnetooptic disk 9, to thereby enable the magnetooptic disk player, in the state illustrated in FIGS. 5 and 6, to selectively carry out a predetermined recording and/or reproducing function.

As cartridge holder 20 is opened in order to draw out disk cartridge 1, as shown in FIG. 5, link 75 pulls locking release member 70 in the opposite arrow of direction a5. Then, spring member 71 of locking release member 70 pushes releasing pin 63 of locking member 60, to thereby rotate locking member 60 counterclockwise. Therefore, the locking state is released by the separation of locking pin 61 from locking protrusion 55 of drawing-out member 50. As the locking state of drawing-out member 50 is released, the disk cartridge moves in the direction opposite of arrow a4 shown in FIG. 11 by the restoring force of tensioned spring 53, so that disk cartridge 1 is drawn out in the direction opposite of arrow a4. Here, linking pin 57 of drawing-out member 50 touches releasing portion 96 of slide locking member 90 during the movement in the drawing-out direction, and thereby slide locking member 90 is pushed aside. Accordingly, locking protrusion 95 of slide locking member 90 is separated from locking pin 94, and sliding member 80 returns to the initial position. Therefore, supporting rod 86 returns to the initial position and magnetic head 30 is lifted.

Also, by opening cartridge holder 20, head ascending support member 100 which is rotated clockwise by plate spring 102 and plate spring contacting portion 106 installed on deck 110 rotates counterclockwise by spring 103, whereby ascending and descending stand 101 and head supporting member contacting portion 105, while rotating upward, lift head supporting member 32. Therefore, although cartridge 20 is opened with magnetic head 30 being in contact with the upper surface of the magnetooptic disk, for example, due to a total discharge of the battery during playing, magnetic head 30 of head supporting member 32 can be raised by ascending/descending stand 101. Therefore, as the minidisk is drawn out, there is no concern about damage to magnetic head 30 due to contact with the drawn-out minidisk 1.

On the other hand, as reproduction-only minidisk 1' is inserted, as shown in FIGS. 5 and 13, slide locking member 90 supported by sliding member 80, is maintained in an initial state, so that there is no problem with damage of the head due to the descending thereof. Also, the other operations are the same as those of above-described recordable minidisk. That is, in the present invention, as the reproduction-only minidisk without a shutter on the upper surface is used, there is no possibility that the magnetic head comes into contact with the reproduction-only minidisk. Therefore, the present invention can properly perform recording and reproducing.

Referring to FIG. 14, another preferred embodiment according to the present invention will be described. Instead of supporting portion 107 (refer to FIG. 5) and spring fixing hole 108 (refer to FIG. 5) formed on sliding member 80, supporting portion 107' and spring fixing hole 108' are each formed on the cartridge holder, and then head ascending support member 100 and spring 103 are installed. As a result, the operation and effect of the magnetooptic disk player according to the present invention are achieved. Here, all other elements have the same function and structure as the previous preferred embodiment.

As described above, the magnetooptic disk player according to the present invention has a simple structure in which a disk cartridge is loaded and unloaded by insertion into a door-type cartridge holder. This is allows reduction in the size of the player. Also, since electrical power is not consumed in the opening and closing of the cartridge holder and in the ascending and descending of the magnetic head, power consumption is lower, while the magnetic head is completely protected. Therefore, the present invention is very effective in the miniaturization of the auxiliary memory of a computer or similar apparatus as well as a portable magnetooptic disk player.

The invention has been described through preferred embodiments. Various modifications will be apparent to those skilled in the art without departing from the scope of the invention as defined by the appended claims.

What is claimed is:

1. A magnetooptic disk player which comprises a cartridge holder into which a magnetooptic disk cartridge is inserted, said cartridge holder being pivotable between an open position at which said disk cartridge is loaded therein and a closed position at which said disk cartridge is disposed on a turntable, a magnetic head which contacts a magnetooptic disk housed in the magnetooptic disk cartridge and a deck onto which the magnetooptic disk is loaded when the cartridge holder is moved from the open position to the closed position, wherein said magnetooptic disk player further comprises:

a head supporting member coupled to said cartridge holder, said magnetic head being disposed on said head supporting member said head supporting member being moveable to ascend and descend so that the magnetic head selectively makes contact with the magnetooptic disk; and head ascending support means installed on said cartridge holder, for lifting the head supporting member relative to the cartridge holder and maintaining said head supporting member in a raised position in response to movement of the cartridge holder to the open position when a said disk cartridge which is recordable is loaded in the cartridge holder and lowering the head supporting member relative to the cartridge holder in response to movement of the cartridge holder to the closed position when a said disk cartridge which is recordable is loaded in the cartridge holder, to thereby prevent damage to said magnetic head when said disk cartridge is removed from said cartridge holder.

2. A magnetooptic disk player as claimed in claim 1, wherein said head ascending support means comprises:

a supporting portion formed on the cartridge holder; a head ascending support member rotatably installed on the supporting portion and in contact with the head supporting member, for lifting and lowering said head supporting member; and a spring for elastically biasing the head ascending support member in a first rotational direction.

3. A magnetooptic disk player as claimed in claim 2, wherein said spring is constructed such that one end of the spring is coupled to the cartridge holder, the center portion thereof is coiled around the rotation axis of the head ascending support member, and the other end thereof is connected to the head ascending support member.

4. A magnetooptic disk player as claimed in claim 2, further comprising:

a contacting portion formed at one side of the head ascending support member for making contact with the deck when the cartridge holder is rotated to the closed position to lower said head supporting member; and a head supporting member contacting portion formed at the other side of the head ascending support member, the elastic force of the spring causing said head supporting member contact portion to lift the head supporting member while in contact with the head supporting member.

5. A magnetooptic disk player as claimed in claim 1, wherein said magnetooptic disk player further comprises a plate spring installed on the deck for guiding the head ascending of the head ascending support means.

6. A magnetooptic disk player which comprises a cartridge holder into which a magnetooptic disk cartridge is inserted, said cartridge holder being pivotable between an open position at which said disk cartridge is loaded therein and a closed position at which said disk cartridge is disposed on a turntable, a magnetic head which contacts a magnetooptic disk housed in the magnetooptic disk cartridge, and a deck onto which the magnetooptic disk is loaded when the cartridge holder is moved from the open to the closed position, wherein said magnetooptic disk player further comprises:

a head supporting member for supporting said magnetic head said head supporting member being movable to ascend and descend so that the magnetic head selectively makes contact with the magnetooptic disk;

a sliding member installed on said cartridge holder, and which is pushed when the magnetooptic disk cartridge is inserted into the cartridge holder and then restored to an initial state when the magnetooptic disk cartridge is removed from the cartridge holder; and head ascending support means installed on the sliding member for lifting the head supporting member relative to the cartridge holder and maintaining said bead supporting member in a raised position in response to movement of said cartridge holder to the open position when a said disk cartridge which is recordable is loaded in the cartridge holder and for lowering the head supporting member relative to the cartridge holder in response to movement of the cartridge holder to the closed position when a said disk cartridge which is recordable is loaded in the cartridge holder, to thereby prevent damage to said magnetic head when said disk cartridge is removed from said cartridge holder.

7. A magnetooptic disk player as claimed in claim 6, wherein said head ascending support means comprises:

a supporting portion formed on the sliding member;

a head ascending support member rotatably installed on said supporting portion, for raising and lowering the head supporting member; and a spring for elastically biasing the head ascending support member in a first rotational direction.

8. A magnetooptic disk player as claimed in claim 7, wherein the spring is constructed such that one end thereof is coupled to the sliding member, the center portion of the spring is coiled around the rotating axis of the head ascending support member, and the other end of the spring is coupled to the head ascending support member thereby elastically biasing the head ascending member.

9. A magnetooptic disk player as claimed in claim 6, wherein said magnetooptic disk player further comprises:

a plate spring formed on the deck for smoothly guiding the head ascending of the head ascending support means.

10. A magnetooptic disk player having a cartridge holder adapted to receive a magnetooptic disk cartridge and a deck, said cartridge holder being pivotally mounted on said deck to pivot between an open position in which the cartridge can be inserted into or removed from said cartridge holder and a closed position in which the cartridge received in the cartridge holder is loaded on said deck, said magnetooptic disk player comprising:

a magnetic head;

a head supporting member coupled to said cartridge holder, said magnetic head being disposed on said head supporting member, said head supporting member being movable with respect to said cartridge holder to move said magnetic head between an active position in which said magnetic head is proximate said disk cartridge and an inactive position in which said magnetic head is remote from said disk cartridge;

a support pin disposed on said deck;

a head ascending support member rotatably disposed on said support pin, said head ascending support member having a deck contact portion and a head supporting member contact portion; and a spring coupled to said head ascending support member to bias said head supporting member contact portion into contact with said head supporting member to thereby lift said head supporting member and place said head in the inactive position;

wherein said deck contact portion contacts said deck when said cartridge holder is pivoted to said closed position to cause said head ascending support member to pivot to a position in which said head supporting member contact portion is moved to thereby allow said head supporting member to pivot to a position in which said magnetic head is in the active position.

11. A magnetooptic disk player which comprises a cartridge holder into which a magnetooptic disk cartridge is inserted, said cartridge holder being pivotable between an open position for loading said disk cartridge therein and a closed position, a magnetic head which contacts a magnetooptic disk housed in the magnetooptic disk cartridge and a deck onto which the magnetooptic disk is loaded when the cartridge holder is moved from the open position to the closed position, wherein said magnetooptic disk player further comprises:

a head supporting member coupled to said cartridge holder, said magnetic head being disposed on said head supporting member, said head supporting member being movable to ascend and descend so that the magnetic head selectively makes contacts the magnetooptic disk; and head ascending support means installed on said cartridge holder, for lifting said head supporting member relative to the cartridge holder when the cartridge holder is in the open position and lowering the head supporting member relative to the cartridge holder when the cartridge holder is in the closed position, said head ascending support means comprising a supporting portion formed on the cartridge holder, a support member rotatably installed on the supporting portion, a spring for biasing the support member in a first rotational direction and biasing a head supporting member contacting portion of said supporting member into contact with said head supporting member for lifting said head supporting member away from the magnetooptic disk, a deck contacting portion formed on said support member, said deck contacting portion being in contact with said deck when said cartridge holder is in the closed position to rotate said support member in a second rotational direction against a force of said spring to thereby move said head supporting member contacting portion away from said head supporting member to lower said head supporting member toward the magnetooptic disk.

* * * * *